Fig. 3B
Fig. 3A
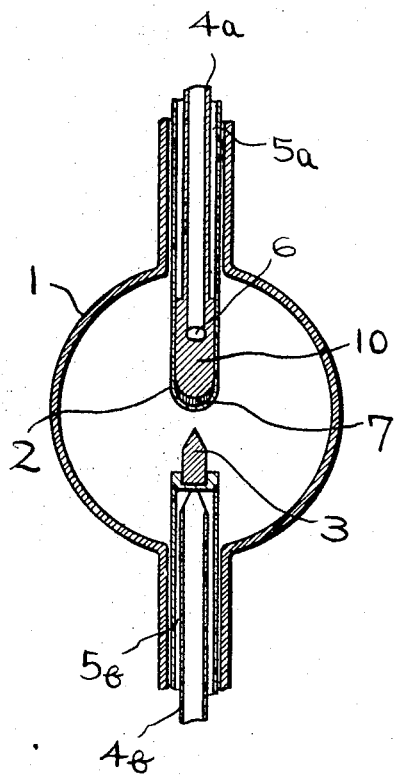
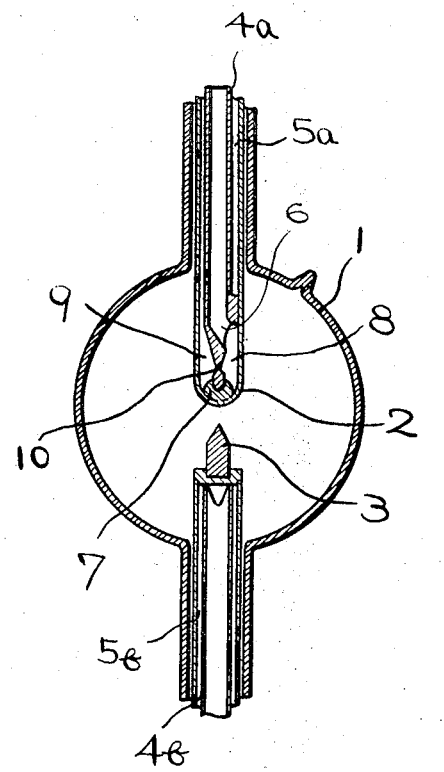

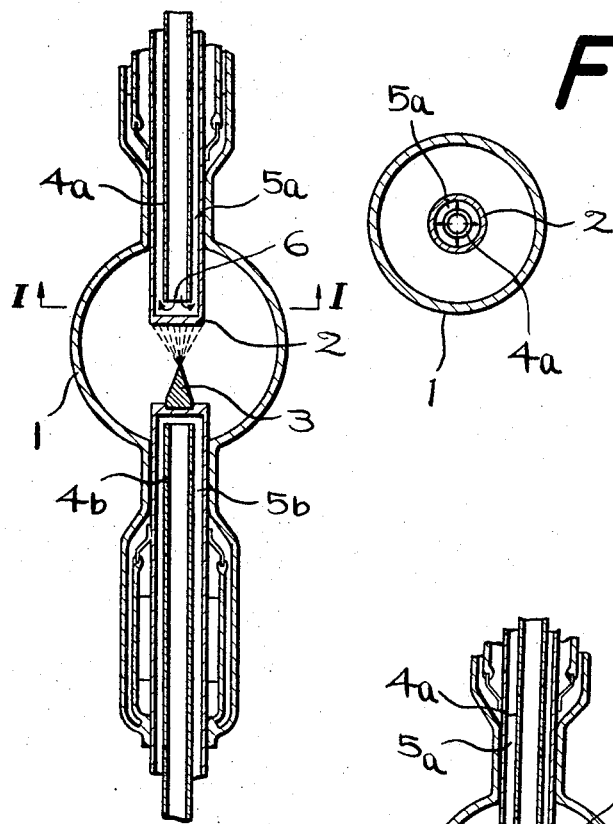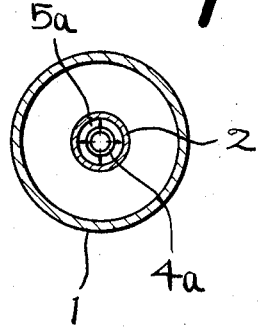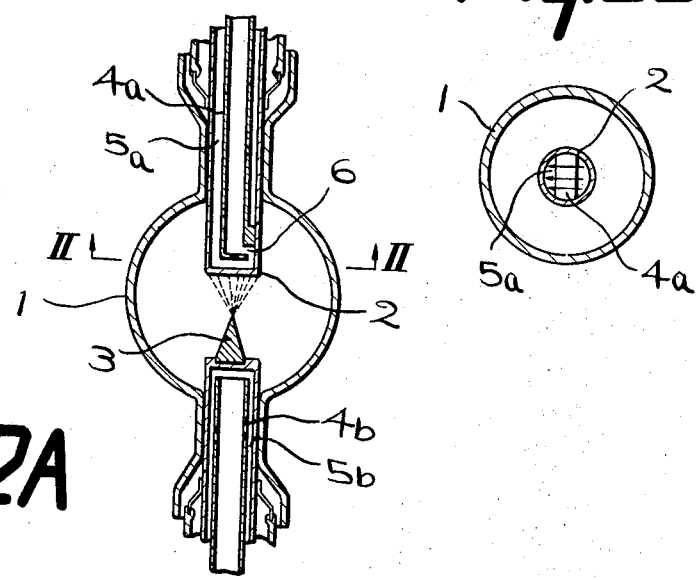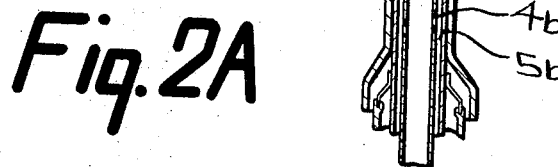

United States Patent Office

3,521,103
Patented July 21, 1970

3,521,103
FLUID COOLED ELECTRODE WITH INTERNAL BAFFLES FOR A HIGH PRESSURE DISCHARGE LAMP
Yoshihiko Nakamura, Himeji, Yasuo Ohnishi, Kobe, and Yasuhiro Shimizu, Himeji, Japan, assignors to Ushio Electric Inc., Tokyo, Japan
Filed Apr. 8, 1968, Ser. No. 719,497
Claims priority, application Japan, Nov. 10, 1967, 42/71,939; Dec. 19, 1967, 42/80,912
Int. Cl. H01j 1/42, 61/06, 61/84
U.S. Cl. 313—32                3 Claims

ABSTRACT OF THE DISCLOSURE

A high pressure discharge lamp of the cooled electrode type comprising electrodes, an envelope, sealing portions for said electrodes and said envelope, a cooling liquid inlet passage and a cooling liquid outlet passage formed in the interior of at least one of said electrodes for introducing a cooling liquid into said electrode and discharging same therefrom, and an indented or grooved portion provided in the interior of the forward end portion of said electrode for increasing the area for dissipating heat from the electrode.

---

The present invention relates to high pressure discharge lamps, and in particular to a high pressure discharge lamp of the cooled electrode type.

Carbon arc lamps have hitherto been employed in solar simulators for space development used for carrying out tests on the irradiation of sun's rays in the outer space where a vacuum prevails or in arc image furnaces used for the study of materials resistant to super high temperatures which are apparatus for melting heat resistant substances by optically concentrating radiating rays or heat rays of discharge lamps. Carbon arc lamps have the disadvantage of being wasted in several to scores of minutes and require replacements each time they are wasted. Moreover, the position of arcs always shifts, so that carbon arcs have been very inconvenient to handle. Accordingly, small type short arc high pressure discharge lamps which contain mercury or a rare gas, such as xenon, argon or the like, enclosed in an envelope under high pressure have gradually taken the place of carbon arc lamps and come to be favored because of their convenience of handling and the stability of arcs. As the equipment grows larger in dimensions, a demand for discharge lamps of higher output has greatly increased in recent years, and air cooled xenon short arc discharge lamps having a maximum capacity for 8 kw. and capable of being in service for several hundred hours have been developed up to the present. There is a growing demand for large type discharge lamps with a capacity for 20, 30, 50 or higher kw.

Short arc discharge lamps of the type described are not without disadvantages. For example, short arc discharge lamps containing xenon or other rare gas enclosed in the envelope which has the largest demand have a low potential gradient at an operating pressure of 20 to 30 atmospheres, so that the lamp voltage does not rise above about 60 v. in the short discharge distance of within about 10 millimeters. If the voltage is forcibly raised above that level, there will be the danger of explosion of the lamp. This makes it necessary to use a low voltage current of high value when it is desired to apply a current of high value. When the capacity of the lamp is, say, 20 kw., and the distance between the electrodes is about 12 mm., the proper lamp current will be one of 400 to 500 A., 50 to 40 v. In the rare gas under high pressure, the arc generated by such current will have a diameter limited to about 10 mm., and when the current is a DC current there will occur a heat loss corresponding to a current of high value up to several kw. in a small portion with a diameter of about 10 mm. disposed at the forward end of the anode. The anode tends to melt at temperatures above about 200 A. and evaporate at elevated temperatures even when the anode is formed of tungsten which has excellent thermal and electric conductivity and the highest resistance to heat of all the pure metals. It has thus been difficult to produce high pressure short arc discharge lamps having a long practical service life.

Accordingly, the principal object of the present invention is to provide a high pressure discharge lamp of the cooled electrode type in which the forward end of at least one of the electrodes is cooled with a liquid for preventing melting and evaporation.

Another object of the invention is to provide a high pressure discharge lamp of the cooled electrode type in which indentations or openings are formed on the walls in the interior of the forward end of the electrode which is brought into contact with a cooling liquid so as to increase the heat dissipation area of the electrode and to prevent the deformation of the electrode due to the inner pressure of the discharge lamp.

A further object of the invention is to provide a high pressure discharge lamp of the cooled electrode type in which the forward end portion of at least one of the electrodes is formed of tantalum, niobium or other high melting point metal which has excellent thermal conductivity, malleability and resistance to heat and which can serve as a getter.

Other objects and advantages of this invention will become apparent from consideration of the following description when taken in conjunction with the accompanying drawings, in which:

FIG. 1A is a longitudinal sectional view of a conventional high pressure discharge lamp of the cooled electrode type showing its bulb portion;

FIG. 1B is a view in section taken on the line I—I of FIG. 1A;

FIG. 2A is a longitudinal sectional view of another conventional high pressure discharge lamp of the cooled electrode type showing its bulb section;

FIG. 2B is a view in section taken on the line II—II of FIG. 2A;

FIG. 3A is a longitudinal sectional front view of one embodiment of the present invention;

FIG. 3B is a longitudinal sectional side view of the embodiment shown in FIG. 3A;

Figure 4:
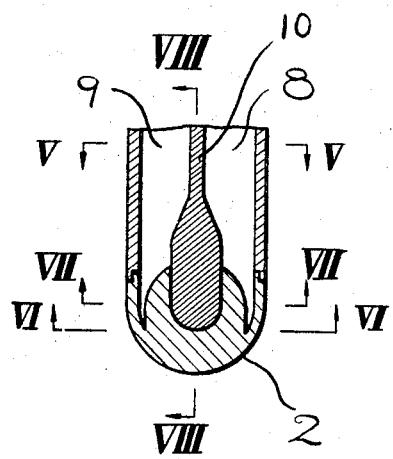
FIG. 4 is a detailed sectional view of the anode portion of the embodiment shown in FIGS. 3A and 3B.
Figure 5:
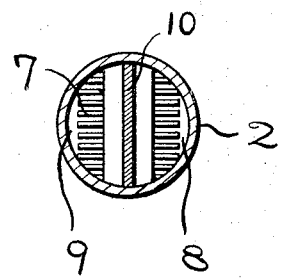
FIG. 5 is a view in section taken on the line V—V of FIG. 4.
Figure 6:
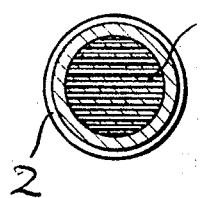
FIG. 6 is a view in section taken on the line VI—VI of FIG. 4.
Figure 7:
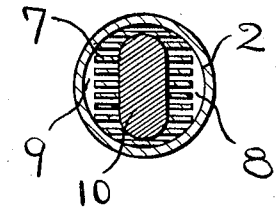
FIG. 7 is a view in section taken on the line VII—VII of FIG. 4.
Figure 8:
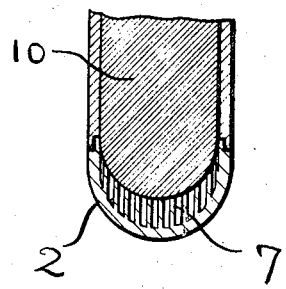
FIG. 8 is a view in section taken on the line VIII—VIII of FIG. 4.

FIGS. 1 and 2 are views in explanation of conventional high pressure discharge lamps of the cooled electrode type. 1 is an envelope formed of quartz; 2 and 3 are an anode and a cathode respectively disposed in face to face relation in the envelope 1 formed of quartz; 4a and 4b are cooling liquid inlet tubes inserted in the interior of the anode 2 and the cathode 3 respectively; 5a and 5b are cooling liquid outlet passages formed between the outer wall of said inlet tube 4a and the inner wall of said anode 2 and the outer wall of the inlet tube 4b and the inner wall of the cathode 3 respectively; and 6 is a cooling liquid discharge port formed in the center of the forward end of said cooling liquid inlet tube 4a, the arrows indicating the direction of flow of the cooling liquid. In this type of discharge lamps, the cooling water flows along the inner surface of the forward end of the anode 2 and is led into the outlet passage 5a through the center of the forward end of the anode.

It has been found that various problems on materials have to be solved when it is desired to increase the value of a current to be applied to lamps of the type described. Each material has its own natural thermal conductivity, and the maximum temperature to which the heat generating portion of an electrode is subjected should be below the melting point temperature of its material. The rate of evaporation and deposition of the materials for electrodes in the period of several hundred hours during which the lamps are kept in service vary depending on the materials. When, for example, the vapour pressure of the materials for electrodes is held below about $10^{-4}$ to $10^{-5}$ torr in order to obtain a desired rate of evaporation and deposition, it is required to maintain the maximum operating temperatures of the electrode $T_{max.}$ to a level which is determined by the material used. If the boundary temperature $Tw$ of the cooling side is maintained by means of a cooling liquid at, say, 100° C., there is a maximum value $Q_{max.}$ in the amount of heat which can be made to pass through the forward end of the electrode in a unit hour if the area thereof is kept constant. The maximum of heat $Q_{max.}$ can be expressed by the formula $$Q_{max.} = \lambda \frac{s}{t}(T_{max.} - Tw)$$

wherein $t$ is the thickness of the forward end of the electrode, $s$ is the area of the forward end of the electrode, and $\lambda$ is the thermal conductivity of the electrode.

If the materials used and the pressure in the lamp between the electrodes were maintained constant, it would be impossible to increase $Q_{max.}$ unless the thickness of the forward end of the electrodes is made smaller; since $\lambda$, $s$ and $t$ inherent in each material of the electrodes are constant. The forward end of the electrodes, be they formed of copper, tungsten or molybdenum, should be below about 3 mm. in thickness when the current used is in the order to 20 kw. and 400 A., if melting or evaporation of the electrodes is to be prevented. One of the conditions that has to be satisfied by all means if the electrodes are to be made to withstand a current of higher values would be to make the thickness of the forward end of the electrodes as small as possible below 3 mm.

On the other hand, the surface of the electrodes of a high pressure discharge lamp tends to undergo a deformation due to a very high pressure of gas of scores of atmospheres in the discharge space and a degradation of mechanical strengths of the material caused by a rise in the temperature of the forward end of the electrodes while the lamp is lighted. This has set allowable minimum thicknesses for materials used for preparing the liquid cooled electrodes of conventional two dimensional construction. It has thus been quite difficult to obtain a practicable liquid cooled high pressure discharge lamp that can operate in a stable manner with a current of over 400 A. (over 15 to 20 kw.), even if copper, tungsten or molybdenum is used as a material for preparing the electrodes.

To sum up, various conditions set forth above combine to make it difficult to obtain a practicable discharge lamp having a high input which is free from the danger of deformation or evaporation of the electrodes if a conventional simple two dimensional construction is used.

Even if the anode 2 and the cathode 3 of a discharge lamp are cooled directly with a liquid, the current passing through the electrodes will have a high density characteristic of light sources when the lamp is of high voltage and high luminance. Particularly, the area with a diameter of several millimeters in the center of the anode 2 is raised to a very high temperature. It is thus required to increase thermal conductivity of the anode 2, reduce the thickness of the anode 2 as much as is possible without decreasing mechanical strengths, and make the cooling water to remove heat from the anode 2 which is heated to a very high temperature, in order that melting or evaporation of the material of anode 2 which generates an arc may be prevented. In conventional discharge lamps, however, the rate of flow of a cooling liquid passing through the center portion of the anode has tended to be slowed down because of the arrangement in which the cooling water discharge port 6 of the anode cooling liquid inlet tube 4a is disposed in the center of the inner wall of the forward end of the anode 2, thereby reducing thermal conductivity. Moreover, the cooling liquid has tended to be boiled when passing through this portion because of the high heat generated therein, thereby further reducing thermal conductivity of the electrode. Accordingly, the anode 2 has tended to evaporate under a relatively low current density, with the result that the discharge lamp is darkened and its service life is shortened.

The aforementioned disadvantages can be obviated by arranging as shown in FIGS. 2A and 2B that the discharge port 6 of the cooling water inlet tube 4a inserted in the anode 2 is disposed on one side of the front end portion of the anode, so that the cooling liquid can flow along the inner surface of the front end portion of the anode 2 into the cooling liquid outlet passage 5a. This arrangement is conducive to preventing the slow down of the flow of cooling liquid in the center of the forward end portion of the anode 2 and boiling of the cooling liquid in this portion of the anode, so that the cooling liquid can effectively perform the function of continuously cooling the center of the front end portion of the anode. This permits to readily prevent melting or evaporation of the anode 2 due to high temperatures, thereby lengthening the service life of the discharge lamp. However, it has still been impossible to obtain a high pressure discharge lamp that can achieve satisfactory results.

Figure 9:
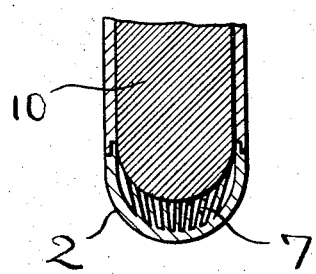
FIG. 9 is a longitudinal sectional side view of another embodiment of this invention showing the anode portion of the high pressure discharge lamp of the cooled electrode type.
Figure 10:
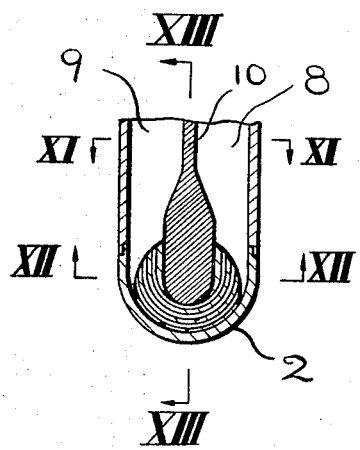
FIG. 10 is a detailed sectional view of the anode portion of still another embodiment of this invention.
Figure 11:
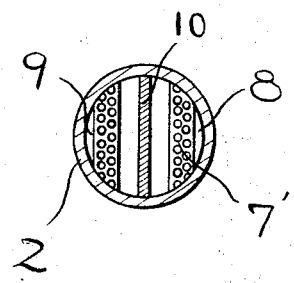
FIG. 11 is a view in section taken on the line XI—XI of FIG. 10.
Figure 12:
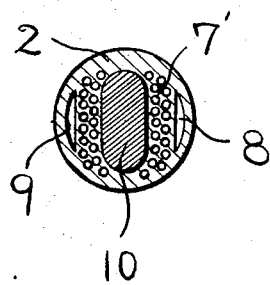
FIG. 12 is a view in section taken on the line XII—XII of FIG. 10.
Figure 13:
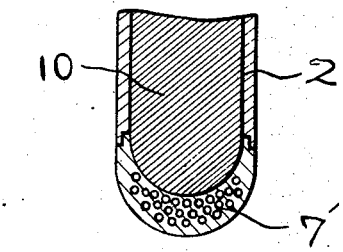
FIG. 13 is a view in section taken on the line XIII—XIII of FIG. 10.

The present invention has been made to provide improvements in high pressure discharge lamps of the cooled electrode type. The invention will now be explained with reference to embodiments illustrated in FIGS. 3 to 13. In embodiments shown in FIGS. 3 to 9, there is provided an indented or grooved portion 7 in which a number of indentations or grooves extending parallel to one another transversely of the anode are formed on the walls in the interior of the front end portion of the anode 2 cooled by a cooling liquid, one end of said indented portion 7 being connected to a cooling liquid inlet passage 8 and the other end of the indented portion 7 being connected to a cooling liquid outlet passage 9. The cooling liquid inlet passage 8 and outlet passage 9 are defined by the walls of the electrode and a partition 10 mounted axially in the center of the electrode. The indentations or grooves formed in the indented or grooved portion 7 of the anode 2 may be, in one aspect of the invention, formed such that they are arranged radially to be directed toward the tip of the cathode 3 as shown in FIG. 9, instead of being aligned with the axis of the arc.

FIGS. 10 to 13 show another embodiment of the invention in which a number of small openings or holes 7' instead of the indentations or grooves 7 are formed in the forward end portion of the anode in such a manner that one end of the openings 7' maintains communication with the cooling liquid inlet passage and the other end of the openings 7' maintains communication with the cooling liquid outlet passage 9.

It is to be understood that in the embodiments of the present invention described above the indentations 7 may be formed to have a various shape in a plan view, such as latticed, radial, spiral or other shape, and that the inlet passage 8 and the outlet passage 9 for the cooling liquid may be formed in a suitable shape for permitting the cooling liquid to flow smoothly through the indentations or openings.

It is also to be understood that the openings 7' may be of various shape in section, such as circular, rectangular, triangular or the like. Those openings which are disposed nearer the forward end of the electrode may have a larger cross-sectional area than the openings disposed farther from the forward end.

It will be appreciated from the foregoing description that the heat dissipation area of the anode 2 of a discharge lamp according to this invention is several times as large as the heat dissipation area of the anode of prior art discharge lamps, with improved cooling function. The projecting members of the indentations 7 can serve as beams for maintaining mechanical strengths of the structure, thereby contributing to the prevention of deformation of the anode 2.

Since the present invention is conducive to preventing the deformation of the electrodes, the electrodes can be made to have a thickness which is ½ to ⅓ the range of 4 to 5 mm. which is an allowable limit to the thickness of two dimensional electrodes of the conventional type and yet to have sufficient mechanical strengths, irrespective of whether the electrodes are formed of copper, tungsten or molybdenum. This enables to increase the current carrying capacity of the lamp two to three times as high as the capacity of conventional lamps. It will thus be appreciated that the present invention permits to increase the maximum allowable current of high pressure rare gas discharge lamps of the liquid cooled electrode type several times as high as that of conventional discharge lamps provided with two dimensional liquid cooled electrodes by merely reducing the thickness of the material of forward end of the electrodes.

In the present invention, tantalum or niobium is preferably used as a material for forming electrodes.

It has been found that when the thickness of the electrodes is reduced to about 4 to 2 mm. by using tantalum or niobium as a material for forming the forward end portion of the anode 2, no cracks develop in the forward end portion of the anode 2 after discharges have been carried out over an interval of several hundred hours by passing a current of about 400 A. through the anode. It has also been found that by suitably carrying out cooling of the anode no deposition of evaporated electrode material on the inner wall of the luminescent lamp occurs for an interval of several hundred hours even if the anode is heated to a temperature in the neighborhood of 2400° C. (or more than three times as high as the temperature of about 700° C. to which the electrode formed of copper can be heated). An added advantage of the high pressure discharge lamps according to this invention lies in the fact that the lamps are maintained at a very high temperature range of 1200° to 2000° C. which is suitable for the getter to perform its function while the lamps are lighted, so that impure gases in the lamps can be readily removed and the discharge gas or vapor can be maintained at a high purity which is required for a stable performance of discharge lamps.

It should be understood that the specific preferred embodiment and practices which have been depicted and described herein have been presented by way of disclosure rather than limitation, and that those skilled in the art will appreciate that various modifications, combinations and substitutions may be effected without departure from the spirit and scope of this invention in its broader aspects and as set forth in the accompanying claims.

What is claimed is:

1. A high pressure discharge lamp of the cooled electrode type comprising electrodes, an envelope, sealing portions for said electrodes and said envelope, a cooling liquid inlet passage and a cooling liquid outlet passage formed in the interior of at least one of said electrodes for introducing a cooling liquid into the forward end portion of said electrode and discharging same therefrom, and an indented portion provided in the interior of the forward end portion of said electrode for increasing the area for dissipating heat from the electrode, indentations in said indented portion being arranged parallel to the axis of the arc.

2. A high pressure discharge lamp of the cooled electrode type comprising electrodes, an envelope, sealing portions for said electrodes and said envelope, a cooling liquid inlet passage and a cooling liquid outlet passage formed in the interior of at least one of said electrodes for introducing a cooling liquid into the forward end portion of said electrode and discharging same therefrom, and an indented portion provided in the interior of the forward end portion of said electrode for increasing the area for dissipating heat from the electrode, indentations in said indented portion being inclined with respect to the axis of the arc.

3. A high pressure discharge lamp of the cooled electrode type comprising electrodes, an envelope, sealing portions for said electrodes and said envelope, a cooling liquid inlet passage and a cooling liquid outlet passage formed in the interior of at least one of said electrodes for introducing a cooling liquid into the forward end portion of said electrode and discharging same therefrom, and an indented portion provided in the interior of the forward end portion of said electrode for increasing the area for dissipating heat from the electrode, indentations in said indented portion being made in the form of openings of which certain ones are disposed nearer the forward end of the electrode and have a larger cross-sectional area than others of said openings which are disposed farther from the forward end.

References Cited

UNITED STATES PATENTS

| 2,228,941 | 1/1941 | Ayer | 313—32 |
| 2,617,057 | 11/1952 | Reinger | 313—32 |
| 3,098,165 | 7/1963 | Zitelli | 313—32 X |

FOREIGN PATENTS 902,062   1/1954   Germany.

JAMES W. LAWRENCE, Primary Examiner

C. R. CAMPBELL, Assistant Examiner

U.S. Cl. X.R.

313—35